Aug. 18, 1931.　　B. R. BENJAMIN ET AL　　1,819,587
MOWER HITCH
Filed Feb. 19, 1927
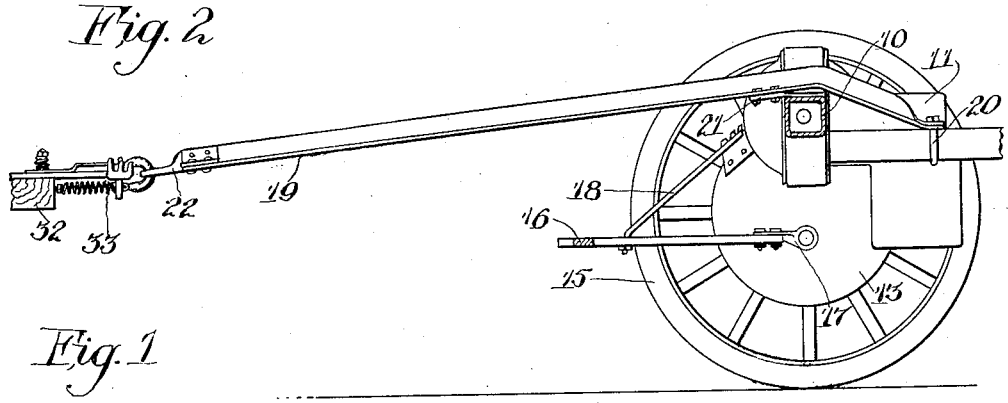
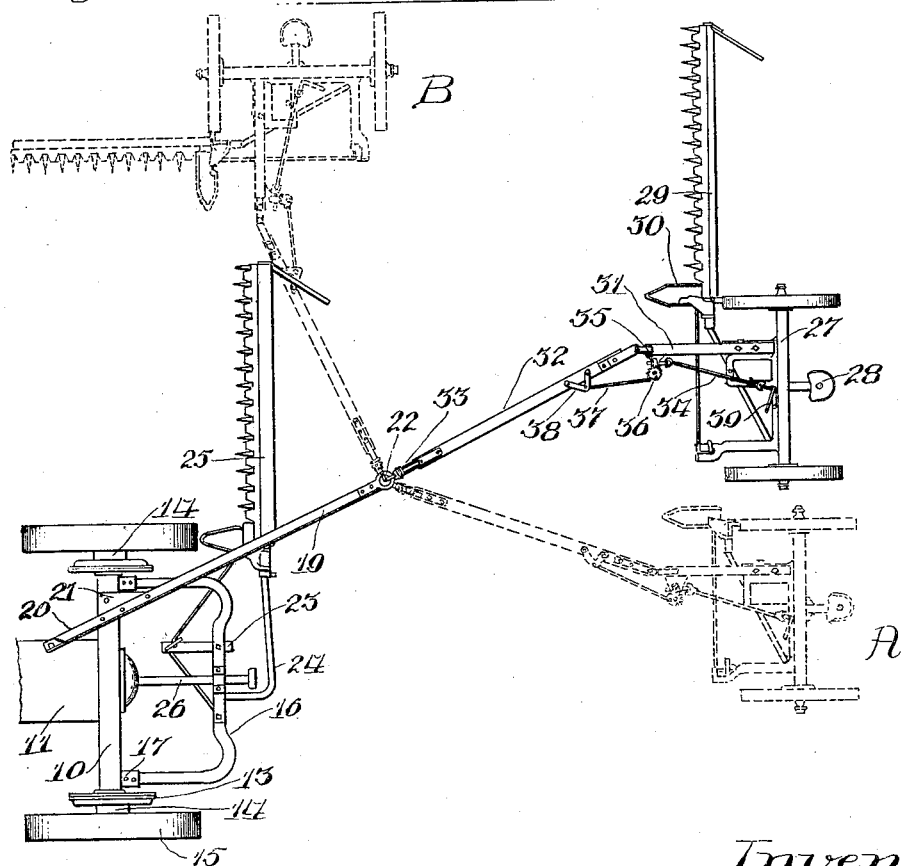
Inventors
Bert R Benjamin
and Charles Pearson
By [signature]
Atty.

Patented Aug. 18, 1931

1,819,587

UNITED STATES PATENT OFFICE

BERT R. BENJAMIN, OF OAK PARK, AND CHARLES PEARSON, OF CHICAGO, ILLINOIS, ASSIGNORS TO INTERNATIONAL HARVESTER COMPANY, A CORPORATION OF NEW JERSEY

MOWER HITCH

Application filed February 19, 1927. Serial No. 169,443.

This invention has to do with hitches and particularly a tractor hitch for enabling a tractor having a tractor engine driven mower attached to its drawbar, to draw a second ground driven mower in proper trailing relationship in such a manner that the ground driven trailing mower will not foul the tractor mower when the tandem is angled in turning corners in a field.

The objects of the invention are to provide a hitch for a tractor, and particularly a tractor of the all purpose type having a relatively high, or arched, rear axle structure, such hitch being designed to enable the tractor to draw a mower in proper offset trailing relationship with respect to another mower attachment connected to the drawbar of the tractor; to provide a flexible hitch which will permit proper trailing of the rear mower on sharp turns without causing the two mowers, that is, their cutter bars, to clash and automatically return the rear mower to its normal position on forward travel; and, lastly, generally to simplify and improve hitches for the purposes stated.

In the present disclosure, these very desirable objects are achieved in combination with a standard type of all-purpose tractor having a relatively high, arched rear axle housing, there being a U-shaped draft bar disposed beneath said axle housing, which draft bar strengthens and forms a part of the rear axle structure. This U-shaped draft bar carries and has connected thereto a power driven mower attachment embodying a laterally extending cutter bar disposed at the rear of the tractor. The tractor rear axle housing securely carries a diagonally and rearwardly extending primary draft member which is disposed above and clears the tractor engine driven tractor mower attachment. The rear end of this primary draft member has an eye formed in its rear free end, which pivotally receives a spring release coupling connected to a secondary draft member which likewise extends rearwardly and is pivotally connected to the stub tongue of a trailing, ground driven mower. By these draft connections the rear mower is made to trail in proper offset relation to the power driven mower attached to the tractor, and they also permit the two mowers to turn square corners in a field without fouling, as will later appear.

In the accompanying sheet of drawings, wherein an illustrative form of the invention has been shown, Figure 1 is a general plan view of the rear end of the tractor and showing the relationship of the hitch thereto in a mower tandem attachment; and Figure 2 is a side elevational view showing the rear end of the tractor and the hitch members connected thereto.

As shown in the drawings, the tractor is of the all-purpose type having a rear transverse, relatively high housing 10, from which extends a forward, centrally disposed, longitudinal body 11. The ends of the housing 10 are provided with communicating depending housings 13, which carry the bearings 14 for mounting the rear traction wheels 15. Spanning the space beneath the housing 10 is a U-shaped draft bar 16 connected by pivot members 17 to the lower ends of the depending housings 13 and adjustably hung from the upper ends of said housings by means of hangers 18.

The improved and simplified hitch embodies a rearwardly extending substantially horizontal primary draft member 19, which, it will be noted, extends diagonally. This member 19 is rigidly bolted at 20 to the body 11 of the tractor and to a bracket 21 carried securely by one end of the rear axle housing 10 of the tractor. The rear end of the member 19 is formed with an eye piece 22, as shown.

The draft bar 16 of the tractor carries the frame 23 of a mower attachment comprising a coupling arm 24 and a cutter bar 25, which is disposed to the rear of the tractor and extends laterally thereof. This tractor mower attachment will be conventionally power driven from the tractor transmission by means of a rearwardly extending power take-off shaft 26, suitably supported on the draft bar 16, as shown. It is to be noted that the primary draft member 19 is disposed substantially above the tractor mower attachment and clears the same in such a manner that it will not interfere with adjustment of the cutter bar 25 to a vertical plane, as is the practice in this art.

The rear mower to be used in the tandem comprises a conventional ground driven mower having a wheel supported main frame 27, operators' seat 28, lateral cutter bar 29, inner shoe 30, and stub tongue 31. Connected to the forward end of this stub tongue for pivotal movement is a forwardly extending secondary draft member 32, which in turn has its forward end pivotally connected, by means of a suitable form of spring release coupling 33, to the eye piece 22 on the primary draft member 19, as clearly shown in Figure 2.

As shown in the prior patent to Pearson No. 1,159,988 of November 9, 1915, (which see for a complete detailed description), the rear mower of the present disclosure embodies a mechanism for manually adjusting said mower in its entirety in a lateral direction, and for holding the said mower in adjusted trailing relationship with respect to the front mower of the tandem. This mechanism briefly comprises a manually turnable shaft 34 operating a worm gear 35 journaled in a bracket carried by the mower stub tongue. This gear 35 drives a three quarter worm gear 36 also journaled on the same bracket, which gear pivotally has connected thereto, a forwardly extending link 37 pivotally connected to a bracket 38, rigidly mounted on the secondary draft connection 32, as shown. It can now be seen that an operator on the rear mower, from his seat 28, can, by means of a suitable control member 39, turn the shaft 34 in either direction to operate the gearing described, for the purpose of pushing or pulling on the link 37 to swing the secondary draft connection to the right or to the left, for example to the extent indicated by dotted line position A. Thus, the rear mower can be properly held in position for offset trailing normal cutting, or in the trailing position A for transportation over and thru narrow places, but normally the bar 32 is disposed substantially in alignment with the first rigid diagonal bar 19.

It is an important feature of this invention to have the primary draft connection positioned, as shown diagonally rearwardly, with the eye 22 lying in a vertical longitudinal plane grasswardly of the grassward traction wheel of the tractor and in a vertical, lateral plane disposed substantially rearwardly of the traction wheels of the tractor. With the eye 22 in this position the rear mower can be kept in proper trailing offset position when cutting on the straight-away; and on a turn at the field corners, the tandem will properly swing around, without clashing of the grassward end of the first cutter bar with the shoe 30 or cutter bar of the rear mower. A square turn in this manner is shown by the dotted line position B of the rear mower in Figure 1.

Thus, the pivot point of the secondary draft connection or hitch bar 32, to which the trailing mower is attached, is located over and to the rear of the forward, or first cutter bar, for the purpose of pulling the trailing mower ahead while the tractor is turning a corner, so as to make the trailing mower completely cut out its own swath. In fact, it runs ahead of the front bar, but, when the tractor has completed the turn and once more goes ahead on the straight-away, it momentarily backs the trailing mower bar which has not yet turned the corner, allowing the forward cutter bar to pass by while the trailing mower is turning, and in this manner prevent the fouling mentioned. Therefore, the important feature is the location of this pivot for the trailing mower enough to the rear and side of the tractor to cause it to pull the trailing mower ahead (while turning) to cut out its swath, for the purpose of finishing a square and clean corner automatically without any adjustment of the trailing tongue or secondary draft connection.

While cutting, if the rear cutter bar should encounter an obstruction, such as a stump for example, offering sufficient resistance to the continued movement of the rear mower, the spring coupling 33 will be detached automatically from the eye piece 22 to disconnect the rear mower, as will be understood, thereby preventing injury to said mower under such or similar circumstances involving a predetermined force or resistance.

It must now be appreciated that the hitch of this invention is simple and achieves all of the desirable objects heretofore recited. It is the intention to cover all such changes and modifications as do not materially depart from the scope of this invention, as is indicated in the following claims.

What is claimed as new is:

1. The combination with a tractor having a pair of rear traction wheels, a drawbar, and a mower having a rearwardly disposed and laterally extending cutter bar connected to said drawbar; of a hitch device for drawing a second mower, the hitch device comprising a primary draft connection rigidly carried by the tractor and extending diagonally rearwardly and outwardly across the first mower attachment and terminating at its free end at a point located laterally of the line of travel of one of the traction wheels and rearwardly of the cutter bar of the first mower, and said second mower including a secondary draft connection pivotally connected to the free end of the primary draft connection.

2. The combination with a tractor having a pair of rear traction wheels, a drawbar, and a mower having a rearwardly disposed and laterally extending cutter bar connected to said drawbar; of a hitch device for drawing a second mower, the hitch device comprising a single primary draft connection carried by the tractor and extending diagonally rearwardly and outwardly across the first mower attachment and carrying at its rear end an eye located at a point laterally of the line of travel of one of the traction wheels and rearwardly of the cutter bar of the first mower, and said second mower including a secondary draft connection pivotally connected to the eye on the first draft connection.

3. The combination with a tractor having a pair of rear traction wheels, a drawbar, and a mower having a rearwardly disposed and laterally extending cutter bar connected to said drawbar; of a hitch device for drawing a second mower, the hitch device comprising a primary draft connection fixedly carried by the tractor and extending diagonally rearwardly and outwardly across the first mower attachment and provided at its rear end with an eye located at a point laterally of the line of travel of one of the traction wheels and rearwardly of the cutter bar of the first mower, said second mower including a cutter bar and a secondary draft connection pivotally connected to the eye on the first draft connection and to the second mower, and means included in the second mower for aligning its draft connection with the primary draft connection to cause the cutter bars of the mowers to trail in tandem offset relationship.

In testimony whereof we affix our signatures.

BERT R. BENJAMIN.
CHARLES PEARSON.